United States Patent [19]

Joder

[11] Patent Number: 5,664,717

[45] Date of Patent: Sep. 9, 1997

[54] PIVOTING SPORTS EQUIPMENT CARRIER

[76] Inventor: Brian K. Joder, 120 Ore St., Folsom, Calif. 95630

[21] Appl. No.: 700,814

[22] Filed: Aug. 21, 1996

Related U.S. Application Data

[60] Provisional application No. 60/006,473, Nov. 13, 1995.

[51] Int. Cl.$^6$ ........................................ B60R 9/10
[52] U.S. Cl. .................. 224/502; 224/509; 224/532; 224/537; 224/924; 224/519
[58] Field of Search ..................... 224/924, 282, 224/497, 502–509, 518, 519, 521, 522, 523, 531, 532, 533, 535, 536, 537; 280/491.5, 506

[56] References Cited

U.S. PATENT DOCUMENTS

| | | |
|---|---|---|
| 2,678,150 | 5/1954 | Lund . |
| 3,202,332 | 8/1965 | Walker . |
| 3,437,248 | 4/1969 | Allen ........................... 224/532 |
| 3,529,737 | 9/1970 | Daugherty . |
| 3,765,581 | 10/1973 | Kosecoff ....................... 224/924 |
| 3,877,622 | 4/1975 | McLain . |
| 3,891,132 | 6/1975 | Chandler . |
| 4,057,182 | 11/1977 | Kolkhorst ..................... 224/924 |
| 4,394,948 | 7/1983 | Graber ......................... 224/924 |
| 4,676,414 | 6/1987 | Deguevara . |
| 4,976,386 | 12/1990 | Geiger ......................... 224/924 |
| 5,004,133 | 4/1991 | Wyers .......................... 224/532 |
| 5,018,651 | 5/1991 | Hull et al. . |
| 5,094,373 | 3/1992 | Lovci . |
| 5,114,120 | 5/1992 | Bartelt et al. ................. 224/509 |
| 5,219,105 | 6/1993 | Kravitz . |
| 5,232,133 | 8/1993 | Speer .......................... 224/497 |
| 5,244,133 | 9/1993 | Abbott et al. . |
| 5,303,857 | 4/1994 | Hewson . |
| 5,344,175 | 9/1994 | Speer .......................... 224/924 |
| 5,372,287 | 12/1994 | Deguevara . |
| 5,443,189 | 8/1995 | Hirschfeld .................... 224/924 |
| 5,454,496 | 10/1995 | Sumida et al. . |
| 5,469,997 | 11/1995 | Carlson . |
| 5,518,159 | 5/1996 | DeGuevara . |
| 5,520,315 | 5/1996 | Graham ........................ 224/509 |
| 5,529,231 | 6/1996 | Burgess . |
| 5,547,116 | 8/1996 | Eckhart ........................ 224/509 |

FOREIGN PATENT DOCUMENTS

| | | | |
|---|---|---|---|
| 2689468 A1 | 10/1993 | France ........................... 224/6 |
| 2258200 A | 2/1993 | United Kingdom ............. 224/924 |
| 2 275 453 A | 8/1994 | United Kingdom . |

*Primary Examiner*—Henry J. Recla
*Assistant Examiner*—Gregory M. Vidovich
*Attorney, Agent, or Firm*—Feix & Feix

[57] ABSTRACT

A pivoting equipment carrier adapted for use with a vehicle having a receiver hitch for receiving said pivoting equipment carrier. The pivoting equipment carrier is movable between a first closed position, wherein equipment carried by the pivoting equipment carrier is held at a desired spaced distance from a rear bumper of the vehicle, and a second clearance position, wherein the equipment is swung rearwardly and outwardly to one side of the vehicle in order to permit full and unobstructed access to a rear entry of the vehicle. The invention includes a first fixed horizontal support arm adapted to be aligned generally parallel with the rear vehicle bumper, and a second movable horizontal support arm pivotally connected to the first fixed horizontal support arm by a first hinge pivot assembly. The first hinge pivot assembly is effective to swing the second movable arm in a horizontal plane about a generally vertical pivot axis through an arc of about 180 degrees between the closed position and a second extended open position. The invention further includes a vertical support post having an equipment carrier assembly disposed connected at an upper end thereof. The lower end of the vertical support post is pivotally connected by a second hinge pivot assembly to the second movable arm. The second hinge pivot assembly is effective to pivot the support post and equipment carrier assembly through a 90 degree arc between a transport position and the clearance position. The invention includes a spring-biased locking assembly which provides the dual function of: (1) releasably locking the vertical support post in the second clearance position; and releasably locking the vertical support post and second movable arm to the first fixed arm when the equipment carrier is in the closed position.

39 Claims, 4 Drawing Sheets

Fig_1

Fig_2

Fig_6

Fig_7

PIVOTING SPORTS EQUIPMENT CARRIER

TECHNICAL FIELD

This application claims the benefit of U.S. Provisional Application No.:60/006,473 filed on Nov. 13, 1995.

The present invention relates generally to article carriers adapted to be detachably connected to the rear of a passenger vehicle to carrier various articles, namely sports equipment, such as bicycles, skis, and the like. More particularly, the present invention relates to an improved article carrier which is detachbly mountable to a receiver hitch of the vehicle and which is capable of being pivoted rearwardly and outwardly to one side of the vehicle to facilitate loading and unloading of the articles and to permit complete and unobstructed access to a rear entry of the vehicle.

BACKGROUND OF THE INVENTION

A common type of article carrier for passenger vehicles which allows full access to the openings of the vehicle, including the passenger side doors, rear doors, rear hatch or tailgate, is the roof mounted article carrier. The roof mounted article carrier typically comprises a roof rack assembly including two horizontal bars that are mounted at the forward and rearward portions of the vehicle roof. Various attachments are used to secure articles, such as bicycles, skis, and other types of sporting equipment, to the bars. One drawback associated with roof mounted rack assemblies is that the user must lift the articles over their head when loading and unloading the articles onto and off of the rack assembly. Thus, in many situations, the loading and unloading procedure can be difficult for a user. For example, the over head lifting of heavier or awkwardly balanced articles, such as bicycles, can be very difficult for short people and also difficult for people who do not possess sufficient strength for repeated lifting. Also, the loading and unloading of articles is more difficult where the roof of the vehicle is high off the ground, such as is the case for vans and most four wheel drive utility vehicles. Further, it is awkward to fasten the articles to the roof mounted bars if the user has difficulty reaching the fastening structure on the bars if the user is not tall enough or the vehicle roof is too high or too wide.

Accordingly, article carriers which mount to the rear of passenger vehicles have become very popular in recent years, especially in view of the increasing popularity of four wheel drive and sport utility vehicles, all of which typically have a high roof. It is well known from the prior art to releasably secure an article carrier to a receiver hitch that is mounted on the rear of a vehicle. An example of one such prior art article carrier is the receiver hitch mounted bike rack disclosed in U.S. Pat. No. 4,676,414 issued to Deguevara. A drawback with the bike rack of Deguevara, however, is that it an all rigid structure and has no pivoting mechanism to allow access to a rear opening of the vehicle.

Another type of prior art receiver hitch mounted article carrier is the vertical tilt down bike rack disclosed in U.S. Pat. No. 5,303,857 issued to Hewson. The vertical tilt down type rack includes a pivoting structure which permits the load to move straight back and down from the rear of the vehicle to facilitate loading and unloading of articles to be carried by the rack. However, this type of article carrier still does not permit complete unobstructed access to the rear of the vehicle.

Another type of prior art receiver hitch mounted article carrier is the swing away style bike rack, two examples of which are disclosed in U.S. Pat. No. 5,094,373 issued to Lovci and U.S. Pat. No. 5,454,496 issued to Sumida et al. The swing away style receiver hitch mounted bike rack designs of Lovci and Sumida et al. include a first fixed horizontal support arm mounted to the receiver hitch of the vehicle and a second horizontal support disposed on top of and pivotally connected to the outboard end of the first fixed arm. The second arm supports a vertical post that carries the load and is operable to swing the vertical post and load away from the rear of the vehicle. The swing away style bike rack designs of Lovci and Sumida et at. tend to be cumbersome in use, especially when the loads to be carried are very heavy.

Also, the swing away style rack designs of Lovci and Sumida et al. are structurally compromised by the design of the pivot or hinge mechanism that is used to connect the upper movable horizontal arm to the lower fixed horizontal arm. More particularly, in each rack design the movable arm is disposed pivotally connected to the top of the fixed arm. In such a swing arm arrangement, all the shear forces and bending moments are concentrated on the pivot axis at the bearing surface between the two arms. Thus, the pivot axis must be designed with sufficient strength in order to withstand the bending and ovalizing forces that are exerted on the pivot bearing surfaces at this point, especially when the rack is swung outward into the open and fully extended position. Over time, heavier loads will tend to cause bending of the pivot axis and/or widening or ovalizing of the bushing surfaces which, in turn, will adversely affect the smooth swinging operation of the rack. Accordingly, it would be desirable to improve the pivot or hinge mechanism of such swing away style racks such that the improved rack can easily handle heavier loads, such as for example loads including four bicycles or more, without bending or premature failure of the pivot or hinge mechanism.

Another problem common to all receiver hitch mountable racks is the tendency of undesirable wobble to develop at the point of attachment of the rack to the receiver hitch. The wobble develops as a result of the inherent tolerance differences between the hollow interior of the receiver hitch and the insertable portion of the rack. Excessive wobble movement can be a detrimental to the integrity of the loads being carried and can interfere with the loading and unloading operation The wobble problem is especially problematic for a swing away style rack since the load, in combination with the extended horizontal support arms, will create a large bending moment or torque that acts directly on the receiver hitch mounting structure. The wobble that develops in the receiver hitch can be great in the case where the rack is heavily loaded, for example, when the rack is used to carry two or more bicycles. Accordingly, a receiver hitch mountable rack design which overcomes the above noted wobble problem would also be desirable.

SUMMARY OF THE INVENTION

It is therefore a principle object of the present invention to provide an improved swing away style rack (referred to hereafter as a "pivoting sports equipment carrier") of the kind which is receivably mountable to a receiver hitch of a vehicle and which overcomes the structural, load carrying capability and convenience limitations of the prior art.

It is another object of the invention to provide a pivoting sports equipment carrier of the type described which is movable between a first closed position, wherein equipment carried by the pivoting equipment carrier is held at a desired spaced distance from a rear bumper of the vehicle, and a second clearance position, wherein the equipment carried by said equipment carrier is swung rearwardly and outwardly to one side of the vehicle in order to permit full and unobstructed access to a rear entry of the vehicle.

Briefly, in accordance with a preferred embodiment, the pivoting sports equipment carrier of the present invention comprises a first fixed horizontal support member or arm adapted to be aligned generally parallel with the rear bumper of a vehicle. The first fixed arm has an inboard end provided with a receiver hitch coupling assembly comprising an insert member formed as a section of steel tubing. In use the insert member is received within the receiver hitch and is fixed in position by a receiver hitch pin and safety clip. The receiver hitch insert is provided with an affixed threaded stud and anti-wobble plate on one side thereof for securing the insert tube against wobble movement within the receiver hitch, irrespective of any tolerance differences that exist between the hollow interior of the receiver hitch and the outer surface configuration of the receiver hitch insert.

The first fixed arm also has an outboard end on which a first hinge pivot assembly is welded thereto. The hinge pivot assembly is used to pivotally connect a second movable horizontal support member or arm to the first fixed arm. The second movable arm is joined to the first hinge pivot assembly by means of a bushing and pinch bolt assembly that is secured through the upper and lower flange holes in the end cap of the second moveable or swinging arm. In this arrangement, the second movable arm is disposed in coplanar relationship with the first fixed arm and is located directly behind the first fixed arm. As can be readily appreciated by those of ordinary skill in the art, the dual flange/pinch bolt design of the first hinge pivot assembly of the present invention evenly distributes shear and bending forces over two vertically spaced pivot bearing surfaces, and thus enabling the pivoting sports equipment carrier to carry heavy loads with smooth pivot operation and long life.

The second movable arm is operable to swing through a 180 degree arc between a first closed position, wherein the second movable arm is disposed generally parallel to and directly behind the first fixed arm, and a second extended position, wherein the first and second arms are substantially colinear.

An advantageous feature of the above described hinge pivot assembly is that it allows the second movable horizontal support arm to swing freely, yet is structurally superior to prior art swing arm assemblies because of the coplanar relationship of the two horizontal members and the load distributed feature of the hinge design. This swing arm assembly of the present invention is also able to open to 180 degrees and at which point it stops against itself and thus there is no need for additional stopping structure.

The pivoting sports equipment carrier of the present invention further includes a vertical support member or post that is pivotally connected to an outboard end of the second movable arm by a second hinge pivot assembly. The vertical support post extends upwardly a vertical distance that is about equal to the chest level of a user when the user is standing behind the vehicle. The upper end of the vertical support post is configured to detachably receive a head tube member of a modular head assembly. The head tube member is specially configured to accept a number of different attachments designed to carry a wide variety of articles, including, but not limited to, sports equipment related articles such as bicycles, skis, golf clubs, etc., and other types of articles such as spare tires and wheel chairs. The attachments are secured in place on the head tube member by means of a locking pin that extends through the head tube member and the attachment accessory. The head tube of the modular head assembly is also preferably inclined upwardly at a slight angle to add ground clearance to the load being carried. In this way, sufficient ground clearance is provided to compensate for road irregularities. This feature is found to be especially advantageous when the load being carried extends further away from the vehicle such that it tends to weigh down and lower the suspension at the rear of the vehicle.

The design and construction of the second hinge or pivot assembly is similarly to the first hinge or pivot mechanism and allows the vertical support post and the load carried by the modular head assembly to rotate through an arc of ninety degrees.

A spring-loaded detent pin and plate mechanism is provided to the base of the load bearing vertical support post and is effective to hold the rack in a closed locked position by means of locking over the edge of a ramp or tab structure that is welded to the first fixed horizontal arm.

In accordance with an advantageous feature of the present invention, the spring-loaded detent pin performs a dual function, in that it is also used to hold the vertical pivoting vertical support post in a ninety degree position from true by means of another ramp plate affixed to the top of the second movable or swinging horizontal arm when the second movable arm is swung into the extended open position. For the user's convenience, a cable or wire control mechanism may be provided to link the detent pin to a hand operated lever disposed at the top of the vertical support post so that the user can operate the spring-loaded detent pin without having to bend over.

In the closed position the pivoting vertical support post is secured from all pivot movement by means of a threaded wing nut bolt that goes through the vertical support post into the first fixed horizontal arm, into which a threaded plug has been affixed.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

The accompanying drawings incorporated in and forming a part of the specification, illustrate several aspects of the present invention, and together with the description serve to explain the principles of the invention.

Reference will now be made in detail to various present preferred embodiments of the invention, examples of which are illustrated in the accompanying drawings.

DETAILED DESCRIPTION OF THE PREFERRED EMBODIMENTS

Figure 1:
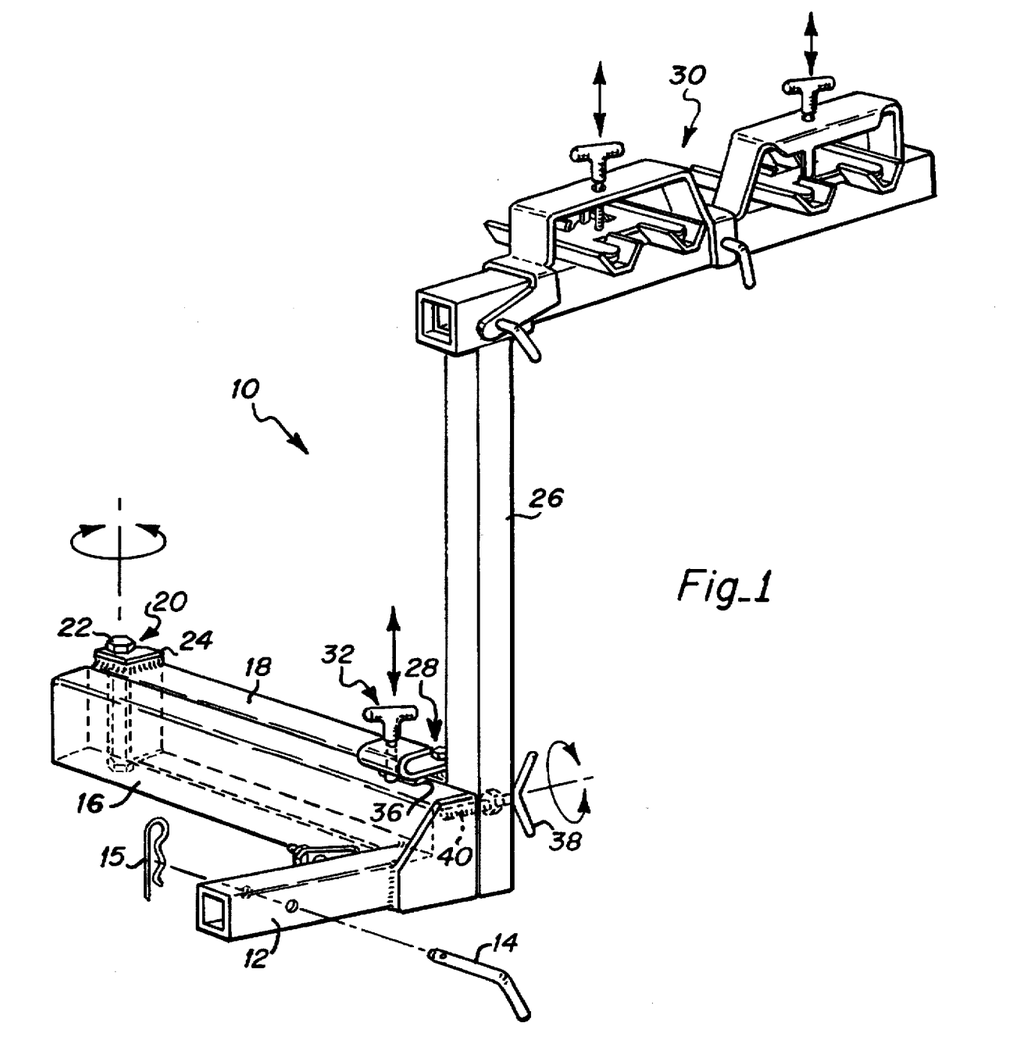
FIG. 1 is an isometric perspective view of the pivoting sports equipment carrier of the present invention as shown in a first closed position.
Figure 2:
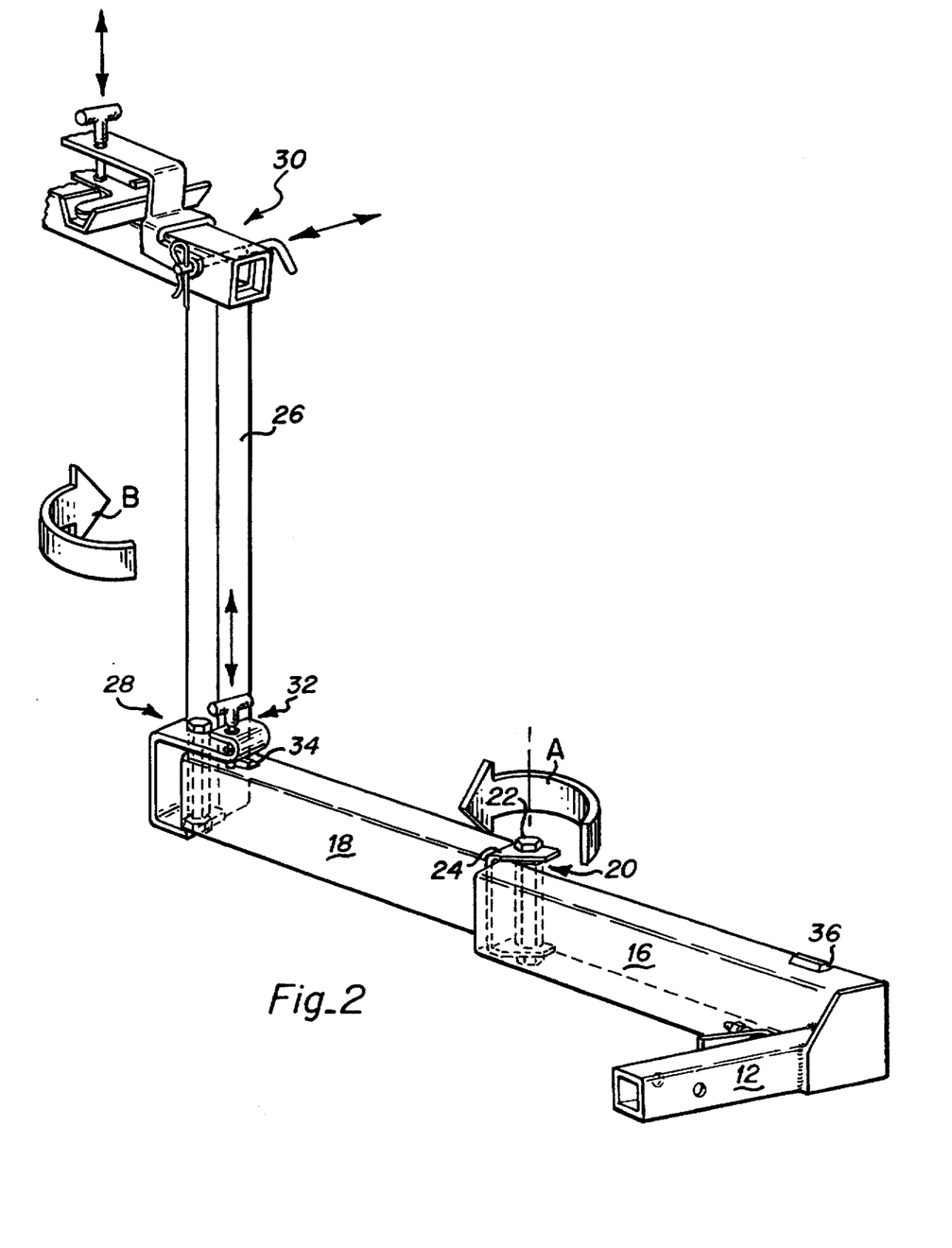
FIG. 2 is another isometric perspective view of the pivoting sports equipment carrier as shown in a fully open, extended position.

A pivoting sports equipment carrier constructed in accordance with one embodiment of the present invention is designated generally by reference numeral 10 in FIGS. 1 and 2. In FIG. 1, the pivoting sports equipment carrier 10 is shown in the closed position. In FIG. 2, the pivoting sports equipment carrier 10 is shown in the fully open, extended position.

The pivoting sports equipment carrier 10 includes coupling means for releasably mounting to a receiver hitch of a vehicle. In a preferred embodiment of the invention, the coupling means comprises a receiver hitch insert member 12 sized for snug fit insertion within the hollow interior of a receiver hitch of a vehicle. The insert member 12 is preferably formed as a section of steel tubing and is fixed in position with a receiver hitch pin 14 and safety clip 15. The hitch insert 12 is also provided with anti-wobble means for firmly securing the hitch insert within the receiver hitch of the vehicle. This anti-wobble feature will be described in more detail with reference to FIG. 7 below.

The pivoting sports equipment carrier 10 further includes a first fixed horizontal support member or arm 16 and a second movable horizontal support member or arm 18. The hitch insert 12 is affixed to an inboard end of the first fixed arm 16 such that the first fixed arm 16 is oriented generally parallel to the rear bumper of the vehicle and extends horizontally to a point approximately ½ the distance from the receiver hitch to the end of the bumper of the vehicle. The first fixed arm 16 and the second movable arm 18 are preferably formed of steel tubing.

The outboard end of the first fixed arm 16 is provided with hinge means comprising a hinge pivot assembly 20 for pivotally connecting the outboard end of the first fixed arm to the inboard end of the second movable arm 18 in coplanar fashion as shown. The inboard end of the movable arm 18 is secured to the hinge pivot 20 assembly by means of a bushing and pinch bolt assembly 22 that is secured through the upper and lower flange holes in end cap 24 provided to the inboard end of the second movable arm 18.

The hinge pivot assembly 20 allows the second movable arm 18 to swing freely through 180 degree arc between a first closed position (shown in FIG. 1) and a second extended, open position (shown in FIG. 2). This swinging movement is indicated by directional arrow A shown in FIG. 2. The end cap 24 at the inboard end of the movable arm 24 abuts against the outboard end of the first fixed arm 16 to limit the range of swinging motion of the second movable arm to about 180 degrees.

A vertical support member or post 26, preferrably formed of steel tubing, is pivotally connected to the outboard end of the movable arm 18 by a second hinge pivot assembly 28. A modular head assembly 30, designed to carry equipment, is detachably connected to the upper end of the vertical support post 26.

The design of the second hinge pivot assembly 28 is similar to that of the first hinge pivot assembly 20 and allows the vertical support post 26 and modular head assembly 30 to rotate through an arc of 90 degrees between a first "transport position" (shown in FIG. 1) to a second "clearance position" (shown in FIG. 2). The 90 degree pivot movement of the vertical support post 26 is indicated by directional arrow B in FIG. 2.

A spring-loaded detent pin mechanism 32 is provided to the base end of the vertical support post 26 and is operative to engage a stopping device such as ramp plate 34 provided to the upper surface of the outboard end of the second movable arm 18 to lock the vertical support post 26 into the 90 degree rotated clearance position of FIG. 2. A second function of the detent pin mechanism 32 is to hold the vertical support post 26 and movable arm 18 to the fixed arm 16 in the closed position (FIG. 1) by lockingly engaging a second stopping device or ramp plate 36 provided to the upper surface of the inboard end of the fixed arm 16. For added user convenience, the detent pin mechanism 32 may be remotely activated by a cable and lever assembly routed from the atop the pivot post.

In the closed position (FIG. 1) the vertical support post 26 is secured from all pivotal movement by means of a threaded wing nut bolt that goes through the vertical support post 26 and into the fixed horizontal support member or arm 16, into which a threaded plug 40 (shown in phantom) has been affixed.

Figure 3:
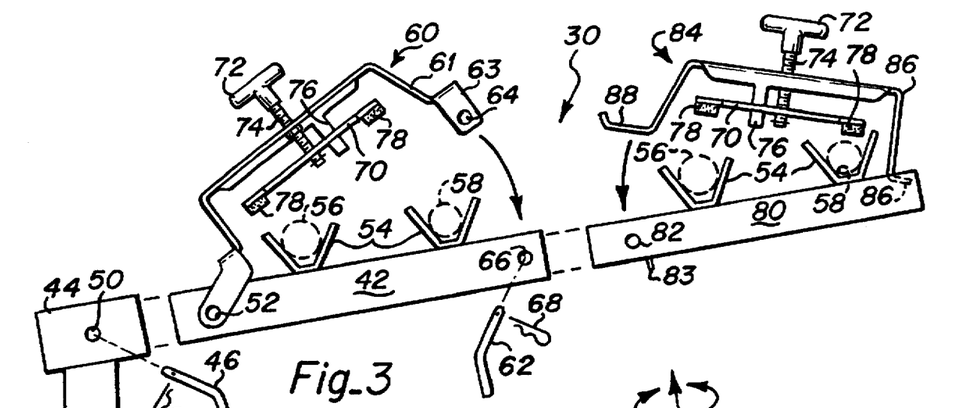
FIG. 3 is an exploded side elevation view of a modular head assembly of the pivoting sports equipment carrier of the present invention.
Figure 4:
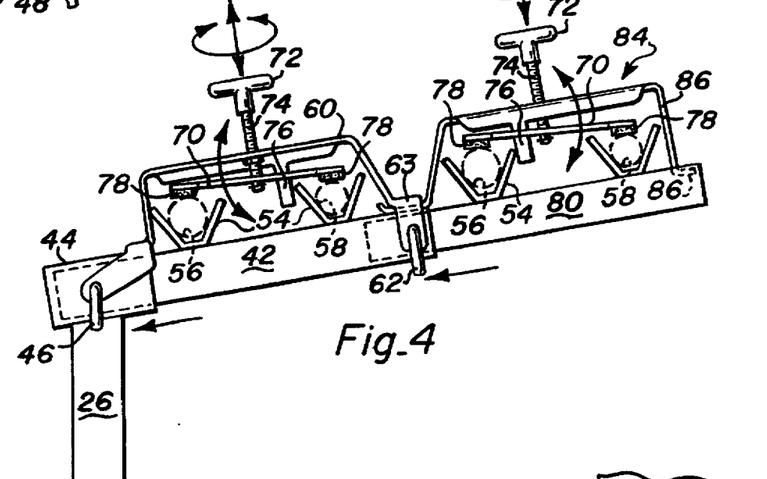
FIG. 4 is side elevation view similar to FIG. 3 but showing the modular head assembly in a fully assembled condition.

Referring now to FIGS. 3–4, the modular head assembly 30 includes a primary head tube 42 tube adapted for receivable engagement within a node like fitting 44 provided to the top end portion of the vertical support post 26. The primary head tube 42 is held in place within the node fitting 44 by means of a standard locking pin 46 that is inserted through the respective coaligned transverse holes 50 and 52 of the node fitting 44 and primary head tube 42 and is secured by a safety clip 48. The primary head tube 42 is constructed of a steel tube. The node fitting 44 is configured to extend the primary head tube 42 outward from the vertical support post 26 and upward at a slight angle α from horizontal. The resulting upward tilt of the modular rack assembly 30 advantageously provides additional ground clearance to the load being carried, as the further the load extends from the vehicle, the more clearance is desired to compensate for road irregularities. The angle of tilt, α, preferably lies within a range of about 1° to about 15°.

The primary head tube 42 is provided with two Vee channels 54 that are attached to the top surface of the primary head tube, preferably by a weld connection. The Vee channels 54 are designed with sufficient depth and width to accommodate bicycle top tubes of varying diameters. Large and small diameter bicycle top tubes are represented by the circles shown in phantom at reference numerals 56 and 58, respectively. The inside surfaces of the Vee channels 54 are preferably lined with silicon rubber or a similar material in order to protect the finish of the bicycle top tube.

Figure 6:
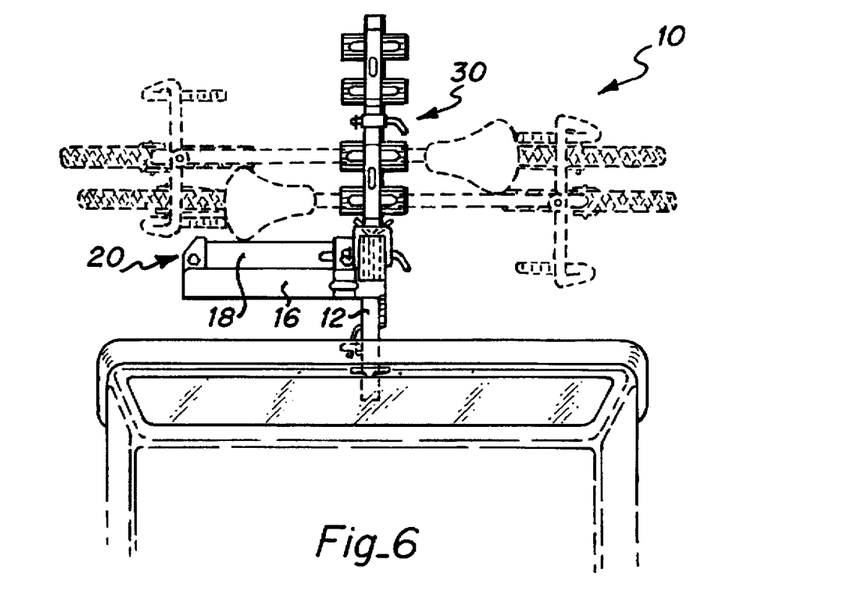
FIG. 6 is a top down view taken from above a vehicle and showing the pivoting sports equipment carrier mounted to the receiver hitch of the vehicle in the closed position.

The bicycles are secured in place by a hinged clamping mechanism 60 which includes a clamp member 61 that hinges over the top of the Vee channels 54 using the modular head locking pin 46 as a pivot axis. As is best seen in FIG. 6, the clamp member 61 of the hinged clamping mechanism 60 is locked in a closed position to the primary head tube by inserting a second locking pin 62 through the respective coaligned transverse holes 64 and 66 of the clamping mechanism 60 and primary head tube 42. As before, a safety pin 68 may be used to hold the pin 62 in place.

The hinged clamping mechanism 60 further includes a compression plate 70 that is used to hold the bicycle top tubes 56 and 58 in place within the Vee channels 54. Vertical adjustment of the compression plate is provided by turning a hand knob 72 of a threaded stud 74 that is guided through a threaded opening located in the center of the hinged clamping mechanism 60. The compression plate 70 is free to pivot horizontally on the shaft of the threaded stud 74 in order to accommodate the different sized bicycle top tubes 56 and 58. The compression plate 70 is kept from rotating by an alignment peg 76 that extends downward from the clamp member 61 to abut against the side edge of the compression plate 70. Rubber pads 78 may be provided to the bicycle top tube contacting surfaces of the compression plate 70 to protect the finish of the bicycle top tubes 56 and 58.

In accordance with the modular concept of the modular head assembly 30, a secondary head tube 80 having an outer tubular surface configured for slip fit insertion within the outboard open end of the primary head tube, may be provided in order to carry additional bicycles. A stop tab 83 may be provided to the secondary head tube 80 to limit the insertion of the secondary head tube 80 within the primary head tube 42 to a desired depth (i.e., where transverse hole 82 of the secondary head tube 80 is coaligned with the transverse hole 66 of the primary head tube 42). Alternatively, a stop tab may be provided within the open end of the primary head tube 42 to limit the insertion depth of the secondary head tube 70 to a desired depth. The secondary head tube 80 is also preferably constructed of steel tubing and is provided with the same Vee channels 54 and compression plate and tightening structure as the primary head assembly. However, the clamp member 86 of the hinged clamp mechanism 84 is modified to include a tab 86 on the outer most end adapted for insertion into a slot (not shown) formed in the outer most end of the secondary head tube 80. The clamp member 86 also includes a tongue 88 on the innermost end of the clamp member 86. The tongue 88 is adapted to be engaged under the locked tabs 63 disposed on the end of the first clamp member 61. The above described clamping arrangement advantageously enables one central locking device to lock all four bicycles on the modular head assembly 30.

Another advantageous feature of the modular head assembly 30 is that the generic design of the primary and/or secondary head tubes can be used as a backbone structure or platform on which different attachment fittings and/or accessories can be mounted for building up a rack structure for carrying various other types of articles including, but not limited to, skis, snowboards, golf bags, spare vehicle tires, wheel chairs, etc. In this way, for example, the user may swap out a first modular head assembly set up to carry bicycles for a second modular head assembly set up to carry skis simply by removing the locking pin 46 so that the primary head tube 42 can be withdrawn from the node fitting 44.

Figure 5:
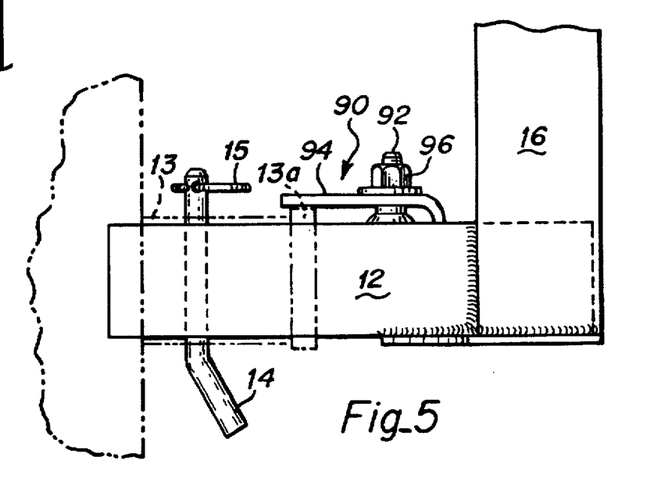
FIG. 5 is an enlarged fragmentary top view of the receiver hitch insert assembly of the present invention.

FIG. 5 shows the detail of the anti-wobble mechanism 90 that is used to tighten up the connection of the hitch insert tube 12 within the vehicle receiver hitch 13 (shown in phantom) in order to prevent wobble movement of the pivoting sports equipment carrier 10 during use. The anti-wobble mechanism 90 comprises a threaded stud 92 affixed to the hitch insert tube 12 and an anti-wobble plate 94, preferably a steel plate. The plate 94 is held against the hitch insert tube 12 by a tightening nut 96 that threads onto the threaded stud so that a free end of the plate bears against the open end (protruded lip 13a) of the receiver hitch 13.

Referring now to FIGS. 1–2 and 7–8, the operation of the pivoting sports equipment carrier 10 of the present invention will now be described. To open the equipment carrier 10 from the closed position (FIGS. 1 and 6), wing bolt 38 is untightened and is withdrawn from engagement with the threaded plug insert 40 and the spring-loaded detent pin 32 is actuated to free the vertical support post 26 and movable horizontal support arm 18 from locked engagement with the fixed horizontal support arm 16. The movable horizontal support arm is then swung about half way into the open extended position as indicated by directional arrow A (see FIGS. 2 and 7). At this point, the vertical support post 26 is rotated 90 degrees in the opposite direction as indicated by directional arrow B (see again FIGS. 2 and 7) to move the vertical support post 26, modular head assembly 30 and the load carried thereby (e.g. bicycles) from the first transport position to the second clearance position. The movable horizontal support arm 18 is then swung the rest of the way open such that the two arms are fully extended.

Figure 7:
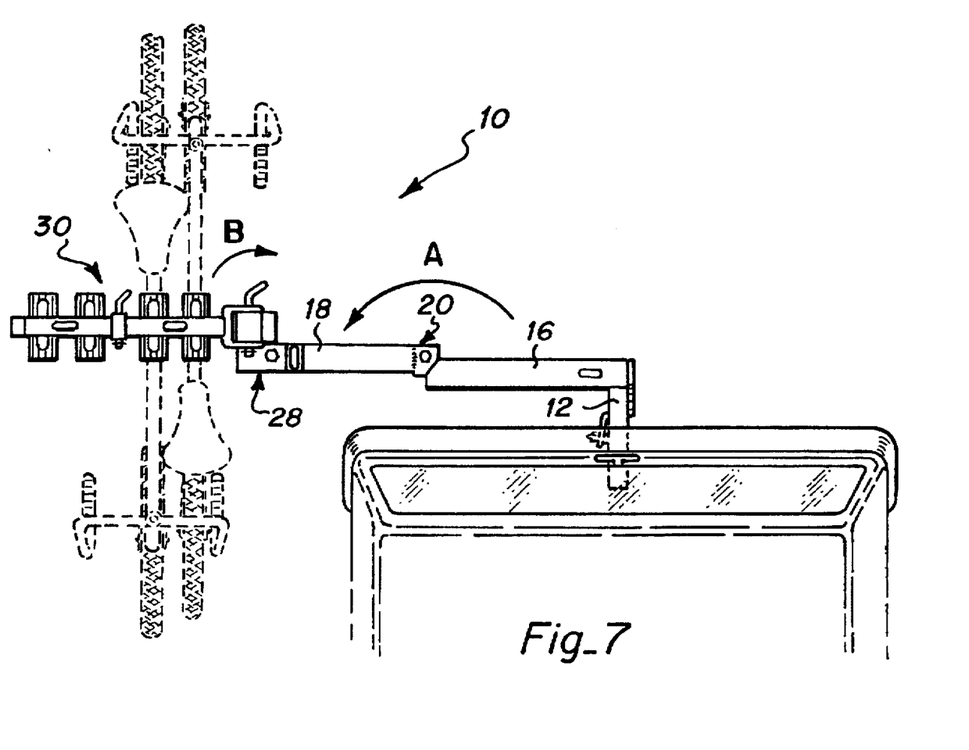
FIG. 7 is a view similar to FIG. 6 but showing the pivoting sports equipment carrier moved into a fully open, extended position.

As is best seen in FIG. 7, the pivoting sports equipment carrier 10 can be pivoted such that the movable horizontal support arm is in the open position and the vertical support post 26 is in the clearance position, the modular head assembly 30 and load are held at a clearance distance off to the side of the vehicle to permit full access to the rear opening or entry (e.g., door, hatch or tailgate) of the vehicle. Also, upon complete 90 degree rotation into the clearance position, the vertical support post 26 is locked in place by engagement of the spring-loaded detent pin 32 over ramp plate 34 (see FIG. 2).

To close the pivoting sports equipment carrier 10, the spring-loaded detent pin 32 is actuated in order to disengage the ramp plate 34 so that the vertical support post 26 and modular head assembly 30 can be moved into the transport position (FIG. 6) as the movable horizontal support arm 18 is swung back into the closed position (FIG. 6).

While I have illustrated and described the preferred embodiments of my invention, it is to be understood that these are capable of variation and modification, and I therefore do not wish to be limited to the precise details set forth, but desire to avail ourselves of such changes and alterations as fall within the purview of the following claims.

What is claimed is:

1. A pivoting equipment carrier adapted for use with a vehicle having a receiver hitch for receiving said pivoting equipment carrier, said pivoting equipment carrier being movable between a first closed position, wherein equipment carried by said pivoting equipment carrier is held at a desired spaced distance from a rear bumper of said vehicle, and a second clearance position, wherein said equipment carried by said equipment carrier is swung rearwardly and outwardly to one side of said vehicle in order to permit full and unobstructed access to a rear entry of said vehicle, said pivoting equipment carrier comprising:
   a) a first fixed horizontal support member adapted to be aligned generally parallel with said rear bumper of said vehicle, said first fixed horizontal support member including an inboard end and an outboard end;
   b) coupling means for removably coupling said inboard end of said first fixed horizontal support member to said receiver hitch of said vehicle;
   c) a second movable horizontal support member disposed in coplanar relationship with said first fixed horizontal support arm and including an inboard end and an outboard end;

d) first hinge means for pivotally connecting said inboard end of said second movable horizontal support member to said outboard end of said first fixed horizontal support member, said first hinge means effective to pivot said second movable horizontal member in a horizontal plane about a generally vertical pivot axis through an arc of about 180 degrees between a first closed position, wherein said second movable horizontal support member is disposed generally parallel to and behind said first fixed horizontal support member, and a second extended position, wherein said second movable horizontal support member is in substantially colinear relation with said first fixed horizontal support member and said outboard end of said second movable horizontal support member extends a desired lateral clearance distance beyond a side jamb of said rear entry of said vehicle;

e) a generally vertically oriented support member including a lower end portion and an upper end portion;

f) an equipment carrier assembly disposed on said upper end portion of said generally vertically oriented support member;

g) second hinge means for pivotally connecting said lower end portion of said generally vertically oriented support member to said outboard end of said second movable horizontal support member, said second hinge means effective to pivot said generally vertically oriented support member and equipment carrier assembly about a generally vertical axis through an arc of about 90 degrees between a first transport position and a second clearance position; and h) first locking means for releasably locking said generally vertically oriented support member in said second clearance position as said second movable horizontal support member is being moved between said first closed position and said second extended position.

2. The pivoting equipment carrier according to claim 1, which further includes second locking means for releasably locking said generally vertically upright support member to said first fixed horizontal support member when said second movable horizontal support member has been moved to said first closed position.

3. The pivoting equipment carrier according to claim 1, wherein said first locking means further includes:
  a) a first stopping device mounted onto said outboard end of said second horizontal support member; and
  b) a spring-biased detent pin mechanism carried by said vertically oriented support member and operable to lockingly engage and disengage said first stopping device.

4. The pivoting equipment carrier according to claim 3, which includes a second stopping device mounted on said inboard end of said first fixed horizontal support member adapted for releasable locking engagement with said spring-biased detent pin mechanism of said first locking means when said second movable horizontal support member is moved into said closed position.

5. The pivoting equipment carrier according to claim 1, wherein said coupling means comprises a tubular hitch insert member having a first end rigidly connected to said inboard end of said first fixed horizontal support member and a second end sized for insertion within said receiver hitch of said vehicle.

6. The pivoting equipment carrier according to claim 5, which further includes anti-wobble means for preventing side to side wobble-movement of said hitch insert member within said receiver hitch.

7. The pivoting equipment carrier according to claim 6, wherein said anti-wobble means comprises a plate coupled to said hitch insert by a bolt fastener; said plate when coupled having a free end disposed overlapping said receiver hitch and adapted to bear against said receiver hitch as said bolt fastener is tightened.

8. The pivoting equipment carrier according to claim 1, wherein said first and second hinge means each comprise a hinge pivot mechanism having two spaced apart pivot bearing surfaces for evenly distributing shear and bending loads.

9. The pivoting equipment carrier according to claim 1, wherein said equipment carrier assembly is tilted upwards a desired tilt angle, $\alpha$, from horizontal to provide added ground clearance to loads being carried by said pivoting equipment carrier.

10. The pivoting equipment carrier according to claim 9, wherein said equipment carrier assembly is detachably connected to said vertical support member.

11. The pivoting equipment carrier according to claim 10, wherein said equipment carrier assembly comprises:
  a) a primary head tube member having a first end configured for detachable connection to said vertical support member and a second end adapted for receivingly engaging a secondary head tube member; and
  b) said primary and said secondary head tube members having an outer surface for mounting article attachment fittings thereon.

12. The pivoting equipment carrier according to claim 1, wherein said equipment carrier assembly is detachably connected to said vertical support member.

13. The pivoting equipment carrier according to claim 1, wherein said first and second horizontal support members are approximately equal in length and have a length dimension falling within a range of lengths between ¼ to ½ of a total length of said rear bumper of said vehicle.

14. A pivoting equipment carrier adapted for use with a vehicle having a receiver hitch for receiving said pivoting equipment carrier, said pivoting equipment carrier being movable between a first closed position, wherein equipment carried by said pivoting equipment carrier is held at a desired spaced distance from a rear bumper of said vehicle, and a second clearance position, wherein said equipment carried by said equipment carrier is swung rearwardly and outwardly to one side of said vehicle in order to permit full and unobstructed access to a rear entry of said vehicle, said pivoting equipment carrier comprising:

a) a first fixed horizontal support member adapted to be aligned generally parallel with said rear bumper of said vehicle, said first fixed horizontal support member including an inboard end adapted to be removably coupled to said receiver hitch of said vehicle and an outboard end;

b) a second movable horizontal support member disposed in coplanar relationship with said first fixed horizontal support arm and including an inboard end and an outboard end;

c) a first hinge pivot assembly for pivotally connecting said inboard end of said second movable horizontal support member to said outboard end of said first fixed horizontal support member, said first hinge pivot assembly effective to pivot said second movable horizontal member in a horizontal plane about a generally vertical pivot axis through an arc of about 180 degrees between a first closed position, wherein said second movable horizontal support member is disposed generally parallel to and behind said first fixed horizontal support member, and a second extended position, wherein said second movable horizontal support member is in substantially colinear relation with said first fixed horizontal support member and said outboard end of said second movable horizontal support member extends a desired lateral clearance distance beyond a side jamb of said rear entry of said vehicle;

d) a generally vertically oriented support member including a lower end portion and an upper end portion;

e) an equipment carrier assembly disposed on said upper end portion of said generally vertically oriented support member;

f) a second hinge pivot assembly for pivotally connecting said lower end portion of said generally vertically oriented support member to said outboard end of said second movable horizontal support member, said second hinge pivot assembly effective to pivot said generally vertically oriented support member and equipment carrier assembly about a generally vertical axis through an arc of about 90 degrees between a first transport position and a second clearance position; and g) a first spring-biased locking assembly for releasably locking said generally vertically oriented support member in said second clearance position as said second movable horizontal support member is being moved between said first closed position and said second extended position.

15. The pivoting equipment carrier according to claim 14, which further includes a wing bolt locking assembly for releasably locking said generally vertically upright support member to said first fixed horizontal support member when said second movable horizontal support member has been moved to said first closed position.

16. The pivoting equipment carrier according to claim 14, wherein said first spring-biased locking assembly further includes:

a) a first stopping device mounted onto said outboard end of said second horizontal support member; and b) a spring-biased detent pin mechanism carried by said vertically oriented support member and operable to lockingly engage and disengage said first stopping device.

17. The pivoting equipment carrier according to claim 16, which includes a second stopping device mounted on said inboard end of said first fixed horizontal support member adapted for releasable locking engagement with said spring-biased detent pin mechanism of said first spring-biased locking assembly when said second movable horizontal support member is moved into said closed position.

18. The pivoting equipment carrier according to claim 14, which further includes an anti-wobble assembly for preventing side to side wobble-movement of said inboard end of said first fixed horizontal support member within said receiver hitch, said anti-wobble assembly comprises a plate coupled to said inboard end of said first fixed horizontal support member by a bolt fastener; said plate when coupled having a free end disposed overlapping said receiver hitch and adapted to bear against said receiver hitch as said bolt fastener is tightened.

19. The pivoting equipment carrier according to claim 14, wherein said first and second hinge pivot assemblies each comprise a hinge pivot mechanism having two spaced apart pivot bearing surfaces for evenly distributing shear and bending loads.

20. The pivoting equipment carrier according to claim 14, wherein said equipment carrier assembly is tilted upwards a desired tilt angle, α, from horizontal to provide added ground clearance to loads being carried by said pivoting equipment carrier.

21. The pivoting equipment carrier according to claim 20, wherein said equipment carrier assembly is detachably connected to said vertical support member.

22. The pivoting equipment carrier according to claim 20, wherein said equipment carrier assembly comprises:

a) a primary head tube member having a first end configured for detachable connection to said vertical support member and a second end adapted for receivingly engaging a secondary head tube member; and b) said primary and said secondary head tube members having an outer surface for mounting article attachment fittings thereon.

23. The pivoting equipment carrier according to claim 14, wherein said first and second horizontal support members are approximately equal in length and have a length dimension falling within a range of lengths between ¼ to ½ of a total length of said rear bumper of said vehicle.

24. A pivoting equipment carrier adapted for use with a vehicle having a receiver hitch for receiving said pivoting equipment carrier, said pivoting equipment carrier being movable between a first closed position, wherein equipment carried by said pivoting equipment carrier is held at a desired spaced distance from a rear bumper of said vehicle, and a second clearance position, wherein said equipment carried by said equipment carrier is swung rearwardly and outwardly to one side of said vehicle in order to permit full and unobstructed access to a rear entry of said vehicle, said pivoting equipment carrier comprising:

a) a first fixed horizontal support member adapted to be aligned generally parallel with said rear bumper of said vehicle, said first fixed horizontal support member including an inboard end and an outboard end;

b) coupling means for removably coupling said inboard end of said first fixed horizontal support member to said receiver hitch of said vehicle;

c) a second movable horizontal support member disposed in coplanar relationship with said first fixed horizontal support arm and including an inboard end and an outboard end;

d) said first and second horizontal support members are approximately equal in length and each have a length dimension, falling within a range of lengths between ¼ to ½ total length of said rear bumper of said vehicle;

e) first hinge means for pivotally connecting said inboard end of said second movable horizontal support member to said outboard end of said first fixed horizontal support member, said first hinge means effective to pivot said second movable horizontal member in a horizontal plane about a generally vertical pivot axis through an arc of about 180 degrees between a first closed position, wherein said second movable horizontal support member is disposed generally parallel to and behind said first fixed horizontal support member, and a second extended position, wherein said second movable horizontal support member is in substantially colinear relation with said first fixed horizontal support member and said outboard end of said second movable horizontal support member extends a desired lateral clearance distance beyond a side jamb of said rear entry of said vehicle;

f) a generally vertically oriented support member including a lower end portion and an upper end portion, said upper end portion adapted for detachbly mounting a sports equipment carrier assembly thereon;

g) second hinge means for pivotally connecting said lower end portion of said generally vertically oriented support member to said outboard end of said second movable horizontal support member, said second hinge means effective to pivot said generally vertically oriented support member and equipment carrier assembly about a generally vertical axis through an arc of about 90 degrees between a first transport position and a second clearance position.

25. The pivoting equipment carrier according to claim 24, which further includes first locking means for releasably locking said generally vertically oriented support member in said second clearance position as said second movable horizontal support member is being moved between said first closed position and said second extended position.

26. The pivoting equipment carrier according to claim 25, which further includes second locking means for releasably locking said generally vertically upright support member to said first fixed horizontal support member when said second movable horizontal support member has been moved to said first closed position.

27. The pivoting equipment carrier according to claim 26, wherein said first locking means further includes:
   a) a first stopping device mounted onto said outboard end of said second horizontal support member; and
   b) a spring-biased detent pin mechanism carried by said vertically oriented support member and operable to lockingly engage and disengage said first stopping device.

28. The pivoting equipment carrier according to claim 27, which includes a second stopping device mounted on said inboard end of said first fixed horizontal support member adapted for releasable locking engagement with said spring-biased detent pin mechanism of said first locking means when said second movable horizontal support member is moved into said closed position.

29. The pivoting equipment carrier according to claim 24, wherein said coupling means comprises a tubular hitch insert member having a first end rigidly connected to said inboard end of said first fixed horizontal support member and a second end sized for insertion within said receiver hitch of said vehicle.

30. The pivoting equipment carrier according to claim 29, which further includes anti-wobble means for preventing side to side wobble-movement of said hitch insert member within said receiver hitch.

31. The pivoting equipment carrier according to claim 30, wherein said anti-wobble means comprises a plate coupled to said hitch insert by a bolt fastener; said plate when coupled having a free end disposed overlapping said receiver hitch and adapted to bear against said receiver hitch as said bolt fastener is tightened.

32. The pivoting equipment carrier according to claim 24, wherein said first and second hinge means each comprise a hinge pivot mechanism having two spaced apart pivot beating surfaces for evenly distributing shear and bending loads.

33. A pivoting equipment carrier adapted for use with a vehicle having a receiver hitch for receiving said pivoting equipment carrier, said pivoting equipment carrier being movable between a first closed position, wherein equipment carried by said pivoting equipment carrier is held at a desired spaced distance from a rear bumper of said vehicle, and a second clearance position, wherein said equipment carried by said equipment carrier is swung rearwardly and outwardly to one side of said vehicle in order to permit full and unobstructed access to a rear entry of said vehicle, said pivoting equipment carrier comprising:

a) a first fixed horizontal support member adapted to be aligned generally parallel with said rear bumper of said vehicle, said first fixed horizontal support member including an inboard end adapted to be removably coupled to said receiver hitch of said vehicle and an outboard end;

b) a second movable horizontal support member disposed in coplanar relationship with said first fixed horizontal support arm and including an inboard end and an outboard end;

c) said first and second horizontal support members are approximately equal in length and each have a length dimension falling within a range of between ¼ to ½ total length of said rear bumper of said vehicle;

d) first hinge pivot assembly for pivotally connecting said inboard end of said second movable horizontal support member to said outboard end of said first fixed horizontal support member, said first hinge pivot assembly effective to pivot said second movable horizontal member in a horizontal plane about a generally vertical pivot axis through an arc of about 180 degrees between a first closed position, wherein said second movable horizontal support member is disposed generally parallel to and behind said first fixed horizontal support member, and a second extended position, wherein said second movable horizontal support member is in substantially colinear relation with said first fixed horizontal support member and said outboard end of said second movable horizontal support member extends a desired lateral clearance distance beyond a side jamb of said rear entry of said vehicle;

e) a generally vertically oriented support member including a lower end portion and an upper end portion, said upper end portion adapted for detachbly mounting a sports equipment carrier assembly thereon; and f) a second hinge pivot assembly for pivotally connecting said lower end portion of said generally vertically oriented support member to said outboard end of said second movable horizontal support member, said second hinge pivot assembly effective to pivot said generally vertically oriented support member and equipment carrier assembly about a generally vertical axis through an arc of about 90 degrees between a first transport position and a second clearance position.

34. A pivoting equipment carrier as in claim 33, which includes a first spring-biased locking assembly for releasably locking said generally vertically oriented support member in said second clearance position as said second movable horizontal support member is being moved between said first closed position and said second extended position.

35. The pivoting equipment carrier according to claim 33, which further includes a wing bolt locking assembly for releasably locking said generally vertically upright support member to said first fixed horizontal support member when said second movable horizontal support member has been moved to said first closed position.

36. The pivoting equipment carrier according to claim 34, wherein said first spring-biased locking assembly further includes:
   a) a first stopping device mounted onto said outboard end of said second horizontal support member; and
   b) a spring-biased detent pin mechanism carried by said vertically oriented support member and operable to lockingly engage and disengage said first stopping device.

37. The pivoting equipment carrier according to claim 36, which includes a second stopping device mounted on said inboard end of said first fixed horizontal support member adapted for releasable locking engagement with said spring-biased detent pin mechanism of said first spring-biased locking assembly when said second movable horizontal support member is moved into said closed position.

38. The pivoting equipment carrier according to claim 33, which further includes an anti-wobble assembly for preventing side to side wobble-movement of said inboard end of said first fixed horizontal support member within said receiver hitch, said anti-wobble assembly comprises a plate coupled to said inboard end of said first fixed horizontal support member by a bolt fastener; said plate when coupled having a free end disposed overlapping said receiver hitch and adapted to bear against said receiver hitch as said bolt fastener is tightened.

39. The pivoting equipment carrier according to claim 33, wherein said first and second hinge pivot assemblies each comprise a hinge pivot mechanism having two spaced apart pivot bearing surfaces for evenly distributing shear and bending loads.

* * * * *